United States Patent [19]

Chureau

[11] Patent Number: 4,644,677
[45] Date of Patent: Feb. 24, 1987

[54] BAITING MACHINE FOR TRAWL LINE FISHING USING ENTIRE FISHES

[75] Inventor: Bernard Chureau, La Turballe, France

[73] Assignee: Societe Anonyme Recherche, Montage, Production "Polylignes", Saint-Nazaire, France

[21] Appl. No.: 782,593

[22] Filed: Sep. 30, 1985

[51] Int. Cl.⁴ .................. A01K 97/00; A01K 79/00
[52] U.S. Cl. ........................................ 43/4; 43/27.4
[58] Field of Search .............. 43/1, 4, 4.5, 27.4, 43/57.3

[56] References Cited

U.S. PATENT DOCUMENTS

| | | | |
|---|---|---|---|
| 2,518,590 | 8/1950 | Andrist | 43/4 |
| 2,670,556 | 3/1954 | Hopkins | 43/4 |
| 3,377,733 | 4/1968 | Godo | 43/4 |
| 3,997,996 | 12/1976 | Nygaard . | |
| 4,015,359 | 4/1977 | Andrews | 43/4 |
| 4,068,399 | 1/1978 | Bjorshol | 43/4.5 |
| 4,250,648 | 2/1981 | Jacobsen | 43/4 |
| 4,354,323 | 10/1982 | Huff | 43/4 |
| 4,437,254 | 3/1984 | Fancey | 43/4 |
| 4,477,992 | 10/1984 | Lang | 43/4 |

FOREIGN PATENT DOCUMENTS

| | | |
|---|---|---|
| 1115902 | 5/1956 | France . |
| 2069801 | 9/1981 | United Kingdom . |
| 2078474 | 1/1982 | United Kingdom . |

Primary Examiner—Nicholas P. Godici
Assistant Examiner—K. Rowan
Attorney, Agent, or Firm—Young & Thompson

[57] ABSTRACT

The present invention is a baiting machine using entire fishes. The machine combines a guide known for the guiding of the point of the fish hooks, a corridor for the introduction of the baiting fish which is perpendicular to the trajectory of the fish hook point, a retractable wall prolongating the wall of the corridor on the downstream side of the trajectory of the fish hook and a second wall perpendicular to the first, said second wall being prolongated by an arm which can be caught by the fish hook in order to pivot the retractable wall about a pivoting axis situated toward the corridor and downstream with respect to the trajectory of the fish hook and an oblique ramp pushing back the head of the bait introduced along the longitudinal direction of the corridor toward the second wall of the retractable wall. The machine is usable for trawl line fishing.

5 Claims, 10 Drawing Figures

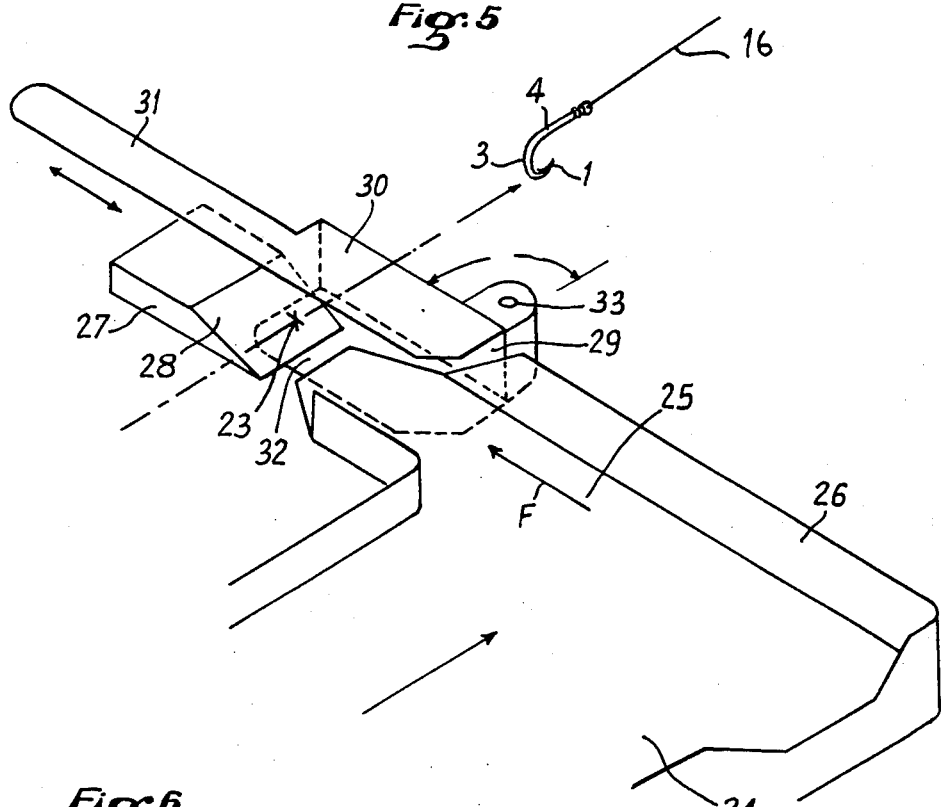
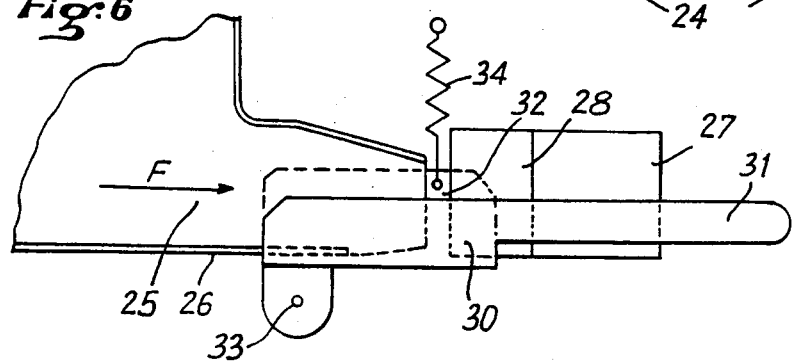
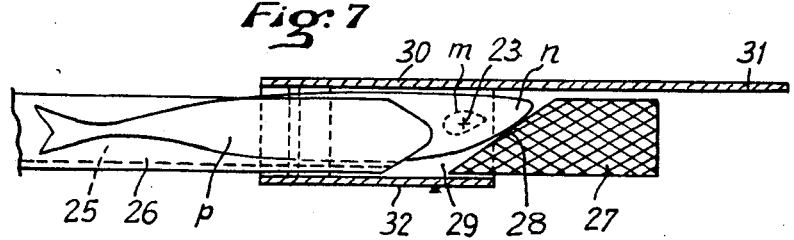

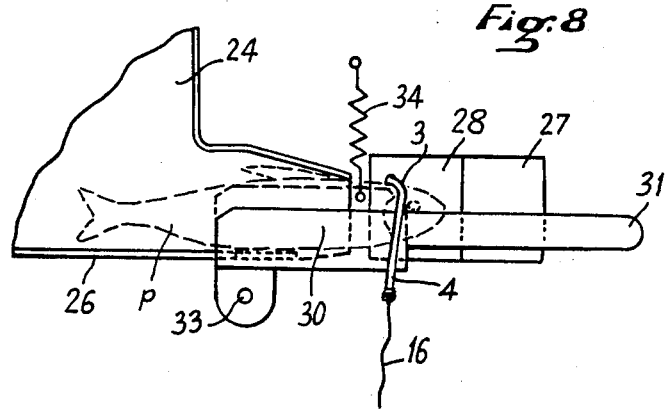
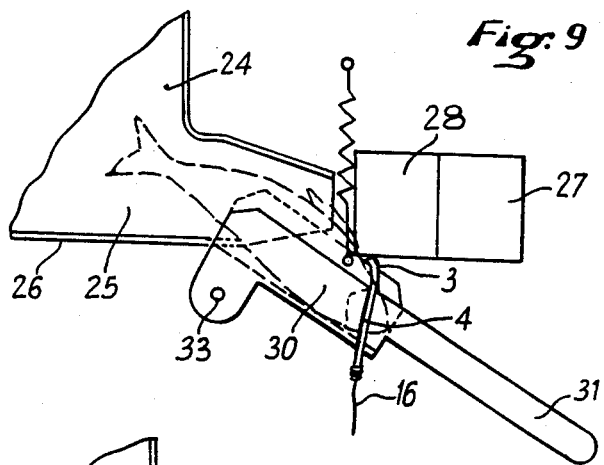
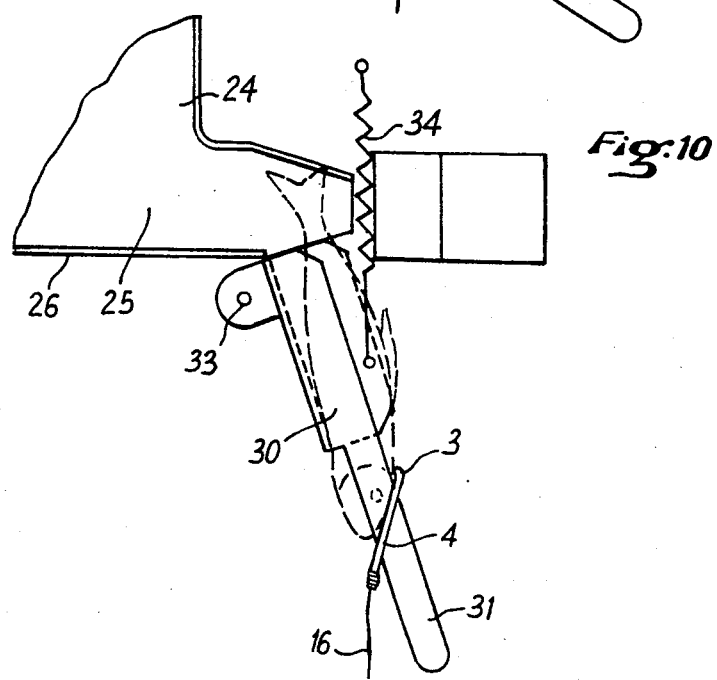

BAITING MACHINE FOR TRAWL LINE FISHING USING ENTIRE FISHES

FIELD OF INVENTION

The trawl line is a standing line for sea-fishing, formed of a main line on which are fixed, from place to place, leaders carrying at their other end a fish hook. The main line has a length of several hundreds of meters and each trawl line carries a hundred fish hooks the average spacing between hooks is three to five meters with leaders of a length of 1 to 1.5 meters. When the weather is good, it is estimated that the average speed for running out of a trawl line is one fish hook every two seconds. This speed does not take into account the time needed to bait, that is to fix the bait to the fish hook, one by one and by hand. Therefore, in practice, the trawl line is baited before hand and stored, generally in a box, with the baited fish hooks stowed side by side.

BACKGROUND OF PRIOR ART

Various automatic baiting machines which use pieces of fish as bait, possibly fillets, have been proposed, the most improved machine being described in French Patent Application FR-A-2 545 322 filed on May 4, 1983 in the name of the Applicant for a "Machine à boetter pour la peche à la palangre" (A baiting machine for trawl line fishing).

For some trawl line fishing, notably the fishing of hake, entire fish are used as bait. These fish include sardines and mackerels. The devices used for randomly hooking the bait, such as the automatic machines of the prior art, or a fork used for presenting the bait as in the hereabove cited application, are not applicable with entire fish. Moreover, the fishing quality of the bait formed by entire fish is very closely a function of the hooking mode of the bait. In the case where the fish hook transversely crosses the body below a dorsal fin, the fish forms a helix and snarls the bottom of the line under the action of the currents. If the fish hook is caught inside the fish mouth, the above disadvantage is avoided but since the lips are relatively fragile there is a risk of unhooking due if the lips are torn away. The best hooking engages the point of the fish hook within the skull, the point projecting outside the buccal cavity. But such a hooking has to be made with accuracy so as to engage the point of the fish hook in the relatively soft area at the top of the fish brain-pan. Moreover, the fish is relatively fragile and it is not possible to forcibly disengage the fish from the guiding member which has presented the fish to the point of the fish hook.

OBJECTS AND SUMMARY OF INVENTION

The object of the present invention is to provide a baiting machine for trawl lines using the entire fish, which does not present the disadvantages of the prior art machines and which ensures a hooking complying with the above explained conditions. The present invention makes use of the fact that the fish batches used as bait during the drawing out of a trawl line are substantially of the same caliber. Therefore the user does not have to change the settings of the machine.

The baiting machine of trawl lines with entire fish according to the invention combines a guide of known type for the guiding of the point of the fish hooks along a rectilinear trajectory so that the point of the fish hook protrudes with respect to the guide, an introduction corridor for the baiting fish which is perpendicular to the trajectory of the fish hook point, and a retractable door comprising at least a first wall substantially in the prolongation of the corridor wall situated on the downstream side of the trajectory of the fish hook. The retractable door includes a second wall perpendicular to the first wall which is connected to the first wall along the edge of the first wall which is near the fish hook guide. The second wall is prolongated by an arm which can be engaged by the fish hook in order to pivot the retractable door about a pivoting axis situated near the corridor and downstream with respect to the fish hook trajectory. An oblique ramp pushes back the bait head introduced along the longitudinal direction of the corridor toward the second wall of the retractable door, which is on the trajectory of the curvature of the fish hook.

The fish are introduced in the corridor with their bellies toward the downstream portion of the fish hook trajectory and their heads in front so that the skulls are presented to the fish hook point. The oblique ramp acts to apply the heads against the second wall of the retractable door, the nose getting into an acute dihedron formed between the ramp and the second wall so that the soft area of the brain-pan is on the trajectory of the fish hook point. Once the fish hook is driven into the brain-pan, it simultaneously catches the arm and pivots the retractable door as the fish slides against the first wall of the retractable door, after having been quickly disengaged from the oblique ramp so as to be in line with the leader. When the fish hook leaves the pivoting arm, the assembly formed by said arm and the retractable door returns in position, the fish being disengaged from the retractable door.

According to another feature, the fish hook is guided with its point downward, the guide comprising a fish hook positioner with ramps, followed by a tubular channel guiding the fish hook shank, such that the curvature and point of the shank extend through a longitudinal slot at the lower portion of the tubular channel and the fish hook is drawn by the leader. The leader extends through a longitudinal slot at the upper portion of the tubular channel to a main line.

According to another feature, the retractable door has a U-shaped cross-section and forms a guiding device for the ventral portion of the fish.

According to another feature, the oblique ramp is made of a wedged block which can be set in position in the direction of the corridor axis in order to allow the setting to be a function of the size of the fish making up the batch.

According still to another feature, the pivoting axis of the assembly formed by the retractable door and the arm is offset in the downstream direction and is clear from the trajectory of the fish hook, thereby providing a larger radius for the trajectory of the bearing point of the fish hook. The angular rotation speed is therefore smaller in the initial portion. The sliding of the fish hook on the hooking edge of the second wall-arm assembly, and therefore of the fish in the guide formed by the retractable wall, occurs only when the fish hook has reached the symmetrical position, the fish having already substantially pivoted in order to get in line with the leader.

According to still another feature, the advance of the fish in the corridor and the supply of fish are provided by conveyors. The motion of the conveyors is controlled by the passage of a fish hook. The control can be provided mechanically by capstans caught by the fish hook or by the motion of the arm-retractable door assembly or by motors controlled by sensors of the passage of the fish hook.

BRIEF DESCRIPTION OF DRAWINGS

The invention will become more apparent from the following description of one embodiment thereof when taken in conjunction with the accompanying drawings wherein:

FIG. 5 is schematic pictorial view of the baiting device, FIG. 6 is a plan view thereof, FIG. 7 is a sectional view along line VII—VII of FIG. 6, and FIGS. 8 trough 10 are plan views corresponding to FIG. 5 at various stages of the fish disengagement.

DETAILED DESCRIPTION OF INVENTION

Figure 1:
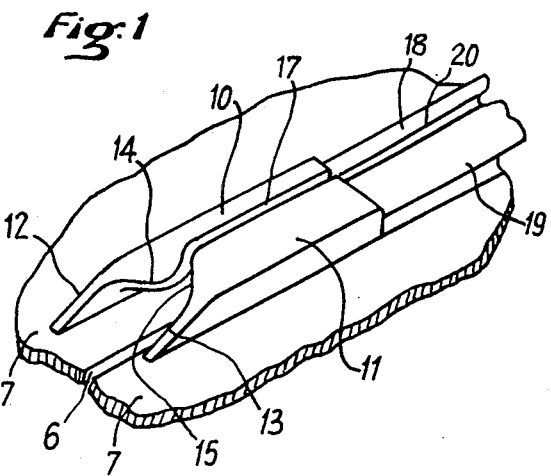
FIG. 1 is a pictorial view from below of the engagement portion of the fish hook guiding rail.
Figure 2:
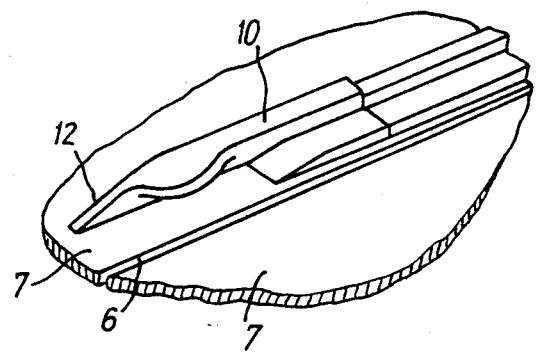
FIG. 2 is a partial view thereof, with one of the elements omitted.
Figure 3:
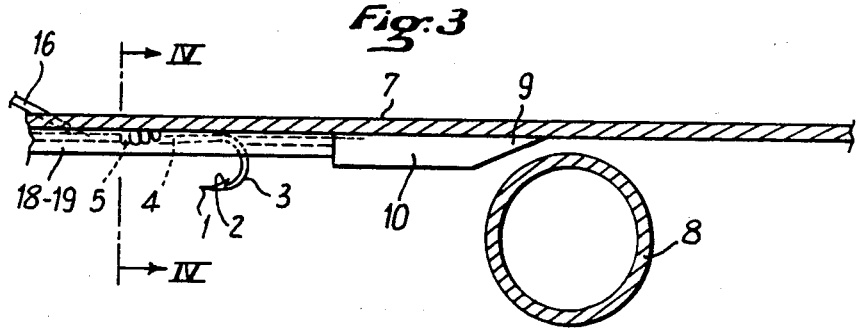
FIG. 3 is a side elevation view thereof and FIG. 4 a sectional view at a larger scale along line IV—IV of FIG. 3.
Figure 4:
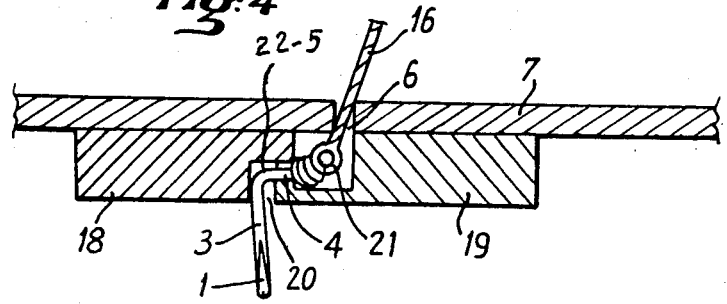

A description is first made with reference to FIGS. 1 through 4 of the guiding device of the fish hook with its point turned downwardly in the baiting machine. The machine is designed so as to operate preferably with so-called inverted fish hooks in which the point 1, the barb 2 and the curvature 3 are in a plane offset with respect to the shank 4 and to the ring or to the pallet 5 (see FIGS. 3 and 4). Under a slot 6 provided in a plate 7 forming the upper lid of the baiting machine is mounted a transverse tube 8 of large diameter, on which the point of the fish hook is rejected to the right or to the left. Above said tube are the points 9 of the two rail noses 10 and 11 of the guiding slide. Said noses comprise a ramp 12, 13 which straightens out the fish hook point 1 in order to point it downwardly and the curvature 3 cooperates, according to whether the fish hook has been rejected to the left or to the right, with engagement cams 14-15 which rotate the curvature plane about shank 4 which is pulled toward the lower face of plate 7 by the leader 16 engaged in slot 6. The main line progressively move away from plate 7 in order to stretch the leaders obliquely (FIG. 3). The fish hook is thus engaged with the plane of its curvature 3 extending through a slot 17. The rail noses 10, 11 are prolongated underneath plate 7 by rails 18, 19 of reduced height for disengaging the fish hook point and curvature (FIG. 3). Between the rails is a slot 20 prolongating slot 17, a channel 21 in communication with slot 6 (FIG. 4) for the passage of the ring 5 and the fastening knot to the leader, channel 21 being connected to slot 20 by a horizontal slot 22 in which moves the shank 4.

The fish hook point follows thus a trajectory shown by axis 23 underneath plate 7, which is shown in FIG. 5.

The baiting apparatus comprises a plate 24 placed underneath the level of plate 7 so that the axis 23 is at a distance preferably settable of about 8 to 10 millimeters above the plane of the plate which is prolongated by a corridor 25 perpendicular to axis 23. Said corridor 25 is defined downstream, in the circulation direction of the fish hook, by a vertical wall 26. The fish p placed flat on plate 24 are engaged in corridor 25 with the ventral portion bearing against wall 26 in the direction of arrow F.

Opposite the outlet of the corridor and on the other side with respect to axis 23 is mounted a settable wedge 27 formed with an inclined plane 28 on the side of the corridor.

Wall 26 is prolongated by a guiding channel formed of a wall 29 parallel to wall 26, downstream and in the immediate vicinity of the latter, by an upper wall 30 parallel to plate 24 and extending above the upper face of wedge 27. The wall 30 is prolongated by an arm 31 and a lower wall 32 is parallel to wall 30 and extends underneath the plane of plate 24. The guiding channel formed by elements 29-30-32 and arm 31 is rotatably mounted about an axis 33 which is offset downstream of wall 26 and at a distance from axis 23 of about half the length of fish p. The assembly is biased to a position in the prolongation of channel 25 by a spring 34.

As shown in FIG. 7, the nose n of fish p advanced in the direction of arrow F in corridor 25 engages along the inclined ram 28 of wedge 27 by bearing underneath plate 30. The soft area m of the brain-pan is then intersected by axis 23.

When the fish hook point reaches the position facing the device, it drives into area m of the brain-pan (FIG. 8). The leader 16 with the fish hook apply, provides through its action on fish p a force on the mobile assembly comprising the guiding channel and the arm 31. The assembly pivots about axis 33 while stretching spring 34 (FIG. 10). The fish has then pivoted about axis 33, and as the rotation proceeds (FIG. 10) the curvature 3 of the fish hook comes in contact with the edge of the arm 31 and the fish starts sliding outside the guiding channel 29-30-32.

The device gently treats the bait which is not subjected to a brutal pull. The fish hook penetrating the brain-pan and comes to bear via its curvature against the mobile arm 31, which ensures the desired motion.

I claim:

1. A baiting machine for trawl line fishing using entire fish, comprising: a guide of known type to guide the point of a plurality of fish hooks having a curvature along a rectilinear trajectory, the point of each fish hook protruding with respect to the guide; an introduction corridor for the admittance of baiting fish, said corridor being perpendicular to the trajectory of the fish hook point and having a wall; a retractable door comprising at least a first wall substantially in a prolongation of the corridor wall situated on the downstream side of the trajectory of the fish hook, wherein the retractable door includes a second wall perpendicular to the first wall and connected to said first wall along the edge of said first wall which is near the fish hook guide, said second wall being prolongated by an arm which can be engaged by the fish hook in order to pivot the retractable door about a pivoting axis situated near the corridor and downstream with respect to the fish hook trajectory; and an oblique ramp pushing back a head of the baiting fish which are introduced along the longitudinal direction of the corridor toward the second wall of the retractable door, said second wall being on the trajectory of the curvature of the fish hook.

2. A baiting machine according to claim 1, wherein the fish hook comprises a shank and is guided with its point downwardly, the guide further comprising a fish hook positioner with ramps followed by a tubular channel for guiding the fish hook shank, the curvature and point of the shank extending through a longitudinal slot at a lower portion of the tubular channel, and wherein the fish hook is drawn by a leader which extends through a longitudinal slot at an upper portion of the tubular channel, to a main line.

3. A baiting machine according to claim 1, wherein the retractable door has a U-shaped cross-section and forms a guiding device for the ventral portion of the fish.

4. A baiting machine according to claim 1, wherein the oblique ramp is made of a wedged block which can be set in position in the direction of the axis of corridor in order to allow a setting to be a function of a size of the fish being baited.

5. A baiting machine according to claim 1 wherein a pivoting axis of the assembly formed by the retractable door and the arm is offset in the downstream direction and clear from the trajectory of the fish hook.

* * * * *